United States Patent [19]

Bierck

[11] Patent Number: 5,591,118
[45] Date of Patent: Jan. 7, 1997

[54] LOW PERMEABILITY WASTE CONTAINMENT CONSTRUCTION AND COMPOSITION CONTAINING GRANULAR ACTIVATED CARBON AND METHOD OF MAKING

[76] Inventor: Barnes R. Bierck, P.O.Box 18134, Washington, D.C. 20036

[21] Appl. No.: 151,241

[22] Filed: Nov. 12, 1993

[51] Int. Cl.⁶ .................................................. A62D 3/00
[52] U.S. Cl. ...................... 588/259; 210/170; 405/128; 405/52; 588/249
[58] Field of Search .................................. 405/128, 129, 405/267; 588/249, 259; 210/170, 747

[56] References Cited

U.S. PATENT DOCUMENTS

2,937,142  5/1960  Rios .
4,473,477  9/1984  Beall ........................................ 210/691
4,840,734  6/1989  Johnson ................................... 210/660
4,874,530  10/1989  Kobayashi et al. ..................... 210/718
5,128,174  7/1992  Brotz ......................................... 427/38
5,237,945  8/1993  White ...................................... 112/420
5,348,588  9/1994  Winston ................................... 134/10

*Primary Examiner*—Dennis L. Taylor
*Attorney, Agent, or Firm*—Lowe, Price, LeBlanc & Becker

[57] ABSTRACT

A low permeability waste containment structure includes a clay-containing component such as bentonite in combination with an effective amount of granular activated carbon to retard the migration of organic and inorganic contaminants through the waste material containment construction. The granular activated carbon can be added in amounts up to 20% or more without degrading the physical characteristics of the waste material containment structure.

9 Claims, 4 Drawing Sheets

Fig. 1

PRIOR ART

LOW PERMEABILITY WASTE CONTAINMENT CONSTRUCTION AND COMPOSITION CONTAINING GRANULAR ACTIVATED CARBON AND METHOD OF MAKING

FIELD OF THE INVENTION

The present invention is directed to a low permeability containment wall or liner construction and composition containing granular activated carbon and the method of making the containment wall, in particular, a clay-containing structure including granular activated carbon as an enhancement additive to retard migration of organic and/or inorganic contaminants through the structure to the environment.

BACKGROUND OF THE INVENTION

In the prior art, soil-bentonite slurry walls have been employed at hazardous waste sites to restrict the movement of contaminated groundwater. Construction of a typical soil-bentonite slurry wall begins with excavation of a narrow trench which is kept filled with a bentonite slurry to prevent wall collapse. The bentonite slurry deposits a low permeability filter cake at each side of the soil-trench interface. Subsequently, the trench is backfilled with a soil-bentonite mixture to complete the slurry wall.

Figure 1:
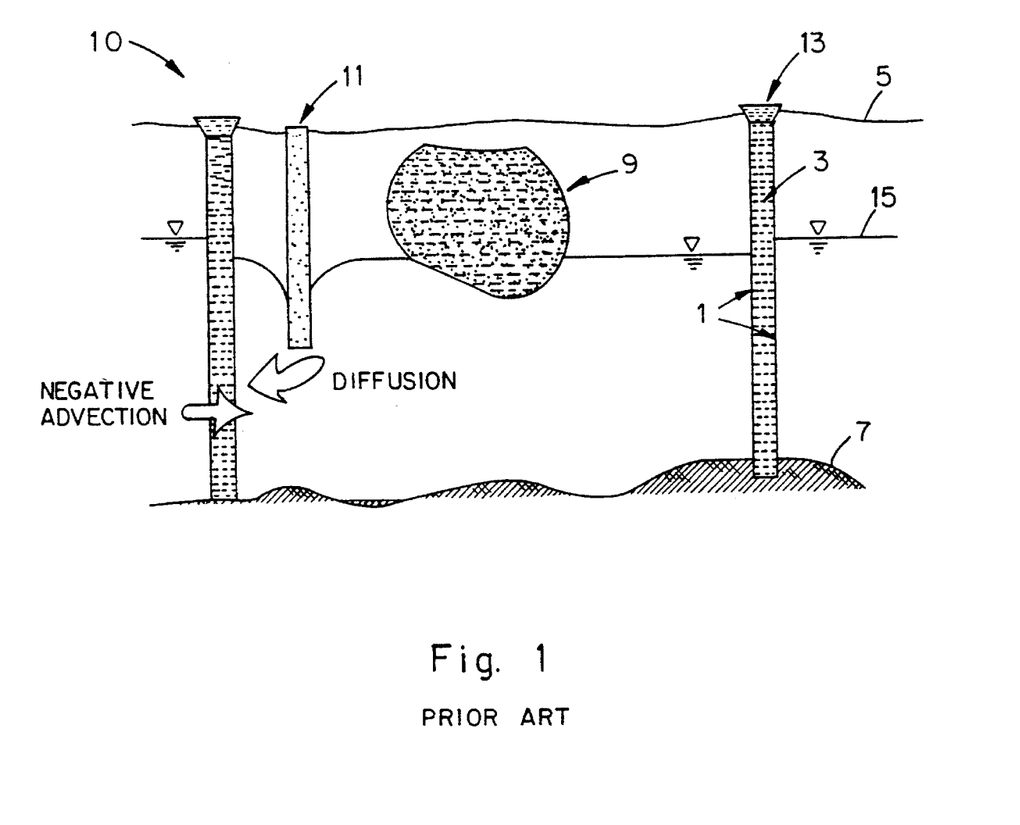
FIG. 1 is a schematic representation of a prior art slurry wall waste site containment system.

FIG. 1 depicts a typical prior art slurry wall designated by the reference numeral 10. The slurry wall includes opposing low permeability filter cakes 1, generally less than 3 mm thick, and a soil-bentonite backfill layer 3 disposed therebetween, generally 1 meter thick. The filter cakes 1 play an important role in the formation of permeability of a completed slurry wall. The presence of the filter cakes ensures that the overall permeability remains below $10^{-6}$ cm/s even when using a soil-bentonite backfill having a permeability of only $10^{-4}$ cm/s.

The slurry walls 10 with earthen caps 13 are formed to extend from the surface 5 to the native impervious layer 7 and surround the waste site 9. Optionally, an extraction well 11 is installed between the slurry wall 10 and the waste site 9 to create a groundwater flow toward the waste site. This flow of groundwater towards the waste site, (negative advection as indicated by the arrow so labeled in FIG. 1) diminishes advective transport or diffusion (indicated by the opposing arrow labeled diffusion) of contaminants from groundwater above or below the water table 15 through the soil-bentonite slurry wall 10 to the surroundings.

However, the slurry walls shown in FIG. 1 are not totally effective in controlling the diffusive migration of organic or inorganic solutes through the slurry wall. Although the advective transport or diffusion of the contaminated groundwater moving away from the waste site can be slowed substantially when hydraulic gradients using extraction wells or the like are created toward the contaminated subsurface regions, the diffusive transport of dissolved waste through these low permeability barriers can still be significant over time. Particularly troublesome are low molecular weight organic solutes.

Low molecular weight organic solutes can have effective molecular diffusion coefficients only two to four times less in soil-bentonite mixtures than in a free aqueous solution. This small difference between a free aqueous solution and the low permeability structure indicates that slurry walls cannot effectively control the diffusive migration of these types of waste materials.

In response to these deficiencies, various adsorptive materials such as fly ash, zeolite and organically modified clay have been proposed for attenuating contaminant movement through waste containment systems. U.S. Pat. No. 5,132,021 to Alexander discloses in-situ treatment of waste water to prevent groundwater contamination which suggests the addition of a contaminant neutralizing or removing material mixed with a water-swellable clay. These adsorbent materials include a wide variety of materials such as natural or synthetic zeolites, organophilic clays, silica hydrogel-base compositions, fibers such as micro-crystalline cellulose and carbon or activated carbons, for example, activated charcoal.

These prior art methods have not been totally successful in solving the problem of organic waste transport through these types of clay walls. For example, the use of fly ash can create other adverse impacts on the environment due to the presence of toxic trace metals, especially complexes of arsenic, selenium and chromium.

The organically-modified clays may also be ineffective in controlling certain specific organic compounds. Depending on what type of organic cation is used, different organically modified clays modify different adsorption preferences for specific organic compounds. Thus, one type of organically-modified clay may not be particularly adapted for adsorption of a particular organic or inorganic contaminant.

As such, a need has developed to provide an improved waste containment wall construction and composition which is effective against a wide range of organic and inorganic compounds, in particular, low molecular weight organic contaminants such as trichlorethylene and dichlorobenzene.

In response to this need, the present invention provides an improved low permeability waste containment construction and composition using granular activated carbon. The proper use of granulated activated carbon in clay-containing waste containment structures does not affect the characteristics of structures such as slurry walls including permeability and thus provides unexpected effectiveness in controlling transport of waste organic and inorganic contaminants through the clay-containing wall structures.

SUMMARY OF THE INVENTION

It is a first object of the present invention to provide an improved low permeability waste material containment structure to restrict the migration of inorganic and organic contaminants into the environment.

Another object of the present invention is to provide a low permeability waste containment structure and composition wherein granular activated carbon is combined with a clay-containing material for effective control of contaminant transport into the environment.

It is a further object of the present invention to provide a method of making a low permeability waste material containment structure by adding granular activated carbon to a clay-containing composition and engineering a containment wall system using the granular activated carbon-containing composition.

Another object of the present invention is to provide a soil-bentonite slurry wall containment system using granular activated carbon for control of organic and inorganic contaminant transport from a waste material site.

Other objects and advantages of the present invention will become apparent as a description thereof proceeds.

In satisfaction of the foregoing objects and advantages, the present invention provides a low permeability composition for containment of waste material including inorganic and organic contaminants wherein the low permeability composition includes at least a clay component. The present invention provides an enhancement additive to the clay-containing composition as granular activated carbon in an amount effective to minimize or prevent inorganic and organic contaminant transport into the environment.

The granular activated carbon, preferably ranging between 50 and 200 mesh, is added to the clay-containing composition in an amount so as not to degrade the overall permeability of the composition or adversely affect the bulk density or other properties thereof. Preferably, the granular activated carbon is added in amounts up to 5%, and more preferably up to 2% by weight of the total composition.

In a more preferred embodiment, the granular activated carbon is used in a soil-bentonite slurry wall wherein the granular activated carbon is substituted for an amount of the soil component of the slurry wall composition.

The present invention also provides a method of forming an engineered low permeability containment structure primarily comprising a clay-containing mixture by adding an amount of a granular activated carbon as an enhancement additive to the mixture to reduce the migration of inorganic and organic contaminants from waste materials through the containment structure.

BRIEF DESCRIPTION OF DRAWINGS

Reference is now made to the drawings accompanying the invention wherein.

DETAILED DESCRIPTION OF THE INVENTION

The present invention provides advantages over other known engineered containment wall structures using clay materials as a component thereof. According to the present invention, granular activated carbon is used as an enhancement additive in these types of waste site containment structures to improve the effectiveness against transport of organic and inorganic contaminants beyond the containment structure and into the environment. When using granular activated carbon as an enhancement additive, containment wall characteristics such as permeability, bulk density and slumping are not adversely effected. Thus, these types of containment waste material constructions can be effectively engineered without any loss of structural integrity or other mechanical or physical properties while having superior contaminant retardation.

The use of granular activated carbon also produces unexpected improvements in preventing or reducing the facilitated transport of contaminants through the ability of the granular activated carbon by its size and shape to be retained in the contaminant wall construction. Since the granular activated carbon is retained in the containment wall structure, it avoids the drawbacks of powdered activated carbon which, due to its size characteristics, can pass through the containment structure with contaminants adhered or adsorbed thereto. In effect, the powdered activated carbon can act as a means of transport for the contaminants, inorganic or organic, to move through the waste containment wall structure and adversely affect the outside environment.

In its broadest embodiment, the present invention is directed to the addition of granular activated carbon as an enhancement additive to the clay portion of a waste material containment structure. For example, the granular activated carbon may be added in an effective amount to the clay portion of landfill liners or other to contain toxic materials. The effective amount of granular activated carbon in a low permeability engineered waste material containment system can vary between zero and an amount which does not adversely affect the containment system properties or integrity. The upper limit is dictated by properties including bulk density, slump, permeability and others.

Typical applications for these types of waste material containment structures include uncontrolled dump sites, various industrial tracts such as tank farms, hazardous waste treatment facilities and their storage and disposal units. An example of such a landfill liner is disclosed in U.S. Pat. No. 5,132,021, herein incorporated by reference in its entirety.

In a more preferred embodiment, the granular activated carbon is added to slurry wall mixtures having a clay component for radically slowing subsurface contaminant transport. These slurry walls can be any known slurry wall construction such as that disclosed in U.S. Pat No. 4,983,075 to Delmas et al. In one preferred method, a 6% bentonite slurry is initially prepared, left to sit for a sufficient period of time to hydrate and then mixed with sand or other soil. The 6% bentonite slurry is preferably gradually added to a known-weight soil or sand such as silica sand while being continuously mixed. In this procedure, the granular activated carbon is added as a substitute for an equivalent amount of the silica sand or soil.

It should be understood that granular activated carbon is effective for reducing the transport of inorganic or organic contaminants through the interstices of a bentonite or clay-containing composition or construction. Thus, the addition of granular activated carbon in effective amounts to reduce contaminant transport is adaptable for any known and engineered waste material containment system utilizing a clay or bentonite component.

Granular activated carbon has also been shown to adsorb metallic ions. This adsorption implies a decreased inorganic ions effect on flocculation such that slurry walls or other waste material containment structures having granulated activated carbon as a component thereof may improve the stability of backfills when containing inorganic wastes.

In an effort to demonstrate the unexpected improvements associated with the use of granular activated carbon in conjunction with clay-containing waste material containment systems, the following are provided. It should be understood that the findings set forth hereinbelow are intended to be merely representative of the invention and the invention is not intended to be limited by the results thereof.

The use of granular activated carbon was tested in conjunction with a soil-bentonite mixture to investigate the effects of granular activated carbon on backfill slump, permeability, and adsorption characteristics.

MATERIALS

For testing purposes, a commercial bentonite (Hydrogel) which is typically sold as a premium grade sodium bentonite was used. A typical chemical analysis of this commercial bentonite is shown in Table 1.

TABLE 1

Typical Chemical Analysis of Commercial Bentonite

| Constituent | % |
|---|---|
| $SiO_2$ | 61.4 |
| $Al_2O_3$ | 18.1 |
| $Fe_2O_3$ | 3.5 |
| $Na_2O$ | 2.3 |
| $MgO$ | 1.7 |
| $CaO$ | 0.4 |
| $TiO$ | 0.2 |
| $K_2O$ | 0.1 |
| Other | 0.07 |
| $H_2O$ | 7.8 |
| Loss On Ignition (LOI) | 4.4 |

Characteristics of the commercial bentonite include a particle density of 2.55±0.1 g/cm$^3$, a specific surface of a 100 m$^2$/g and a particle size of 80% passing through #200 mesh.

The soil used for the demonstration is a high purity silica sand (grade RS-14023), mined out of the Jordan formation in Green Lake, Wis. The grain size distribution of the soil is shown in Table 2.

TABLE 2

Grain Size Distribution of Silica Sand Used*

| ASTM Sieve No. | 70 | 100 | 140 | 200 | 220 |
|---|---|---|---|---|---|
| % Passing | 99.2 | 94.3 | 22.3 | 23.8 | 2.9 |

*data from Badger Mining Corporation

Typical soil test results include: clay wash—0.40%, specific gravity—2.65 and bulk density of 96 lb/ft$^3$.

The granulated activated carbon (GAC) was FisherBrand charcoal from Fisher Scientific having a particle size of 50 to 200 mesh. The granular activated carbon particle density was 1.1 g/cm$^3$ and the specific surface was 1100 m$^2$/g.

For the adsorption testing, an organic compound, 2-pentanone ($CH_3COC_3H_7$), was selected. This organic compound was selected since it was a non-toxic organic compound for safety considerations, it was non-ionizable in solution and such that the organics concentrations dissolved would not affect the properties of the water such as pH and dielectric constant and it was readily measurable, i.e., oxidizable, by the chemical oxygen demand method (COD). It also had a relatively low vapor pressure thus avoiding volatile loss during measurement.

To prevent influence of the dissolved organics on permeability, a low concentration of 200 mg/l was prepared by mixing 2-pentanone with tap water. This low concentration does not significantly change the dielectric constant of the tap water used and, therefore, causes minimum effects on the diffuse double layer and permitivity between clay particles which can lead to change in permeability. Tap water, regarded as having an appropriate ionic strength was chosen as the solvent for the organic compound.

The chemical oxygen demand method, closed reflux method, was used to correlate the concentrations of dissolved organic compounds to COD values. The recovery of 2-pentanone by COD was examined by running a series of known-concentration 2-pentanone solutions covering the experimental concentration range. Oxidation of the 2-pentanone by the oxidant, dichromate was quite consistent and maintained at about 87%.

BENTONITE SLURRY AND BACKFILL PREPARATION

Experimental backfill materials were prepared by following the construction practice of conventional slurry walls. That is, a stock 6% bentonite slurry was first prepared by mixing 940 g of tap water with 60 g of air-dried commercial bentonite. Sufficient mixing of the bentonite layer was obtained after about 30 seconds of mixing in a mini-blender manufactured by Oster, Inc. of Milwaukee, Wis. These procedures were repeated to produce the desired amount of 6% bentonite slurry, the produced amounts stored at room temperatures. The slurry was left to sit for 24 hours to hydrate before mixing the sand therewith.

The stock 6% bentonite slurry was gradually added to a known-weight silica sand and stirred manually during slurry addition by a steel rod to produce a uniform mixture such that no dry soil mass was observed. The composition of the soil-bentonite backfills was then determined by their workability, i.e., the suitability of the backfills for slurry-backfill placement operation, which was measured by a slump cone test (ASTM, 1978). For comparison purposes, a soil-bentonite-granular activated carbon backfill was prepared following the same procedures described above except silica sand was replaced with an equivalent amount of granular activated carbon added at 2% by weight of the backfill mass.

TESTING METHODS

The slump of the backfill mixtures prepared as described above were measured with a slump cone to check whether they met the required range of about 2 to 6 inches, (see Table 3 for the comparison of properties between the two types of backfills prepared for the testing procedure).

TABLE 3

Composition and Geotechnical Properties of Soil-Bentonite Backfill and Soil-Bentonite-GAC Backfill Studied

| Parameter | Soil-Bentonite Backfill | Soil-Bentonite GAC Backfill | Required Rnage |
|---|---|---|---|
| Sand (% wt) | 74 | 72 | — |
| Bentonite (% wt) | 1.55 | 1.55 | >1[b] |
| GAC (% wt) | 0 | 2 | — |
| Water content (%) | 31 | 31 | 25–35[b] |
| Slump (inches) | 3.5 | 2.8 | 2–6[b] |
| Bulk density (g/cm$^3$) | 1.90[a] | 1.86[a] | 1.68–1.92[b] |

[a]Obtained by direct calculation based on mass balance.
[b]Data from D'Appolonia (1980)

As soon as the slump of the backfill satisfied the required range, about 200 g of mixture was immediately sampled and placed into a pre-weighed crucible for water content measurement at 105° C. (ASTM, 1980). The backfill compositions were then calculated.

Figure 2:
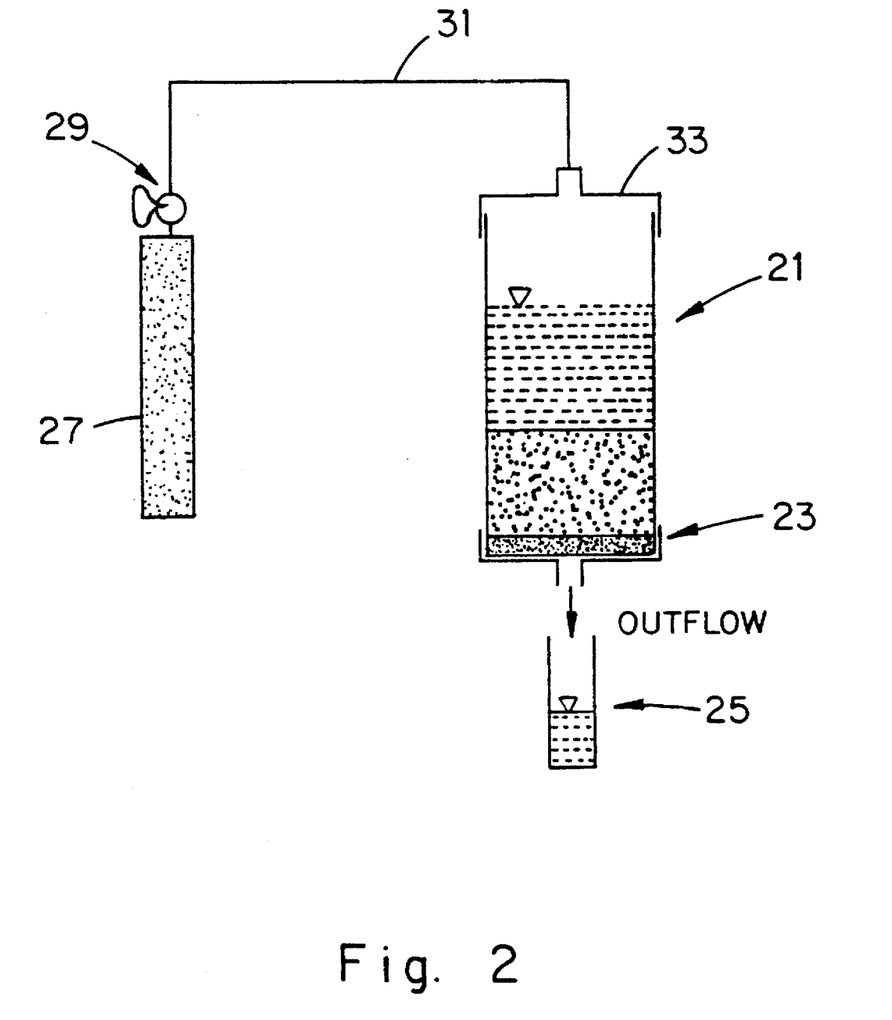
FIG. 2 is a schematic representation of a permeability test apparatus.

For permeability testing, an apparatus as shown in FIG. 2 was used. The permeability tests were conducted using a 47 mm by 16.1 cm stainless steel pressure filtration funnel 21. The permeability test apparatus shown in FIG. 2 is schematically similar but smaller than the American Petroleum Institute test apparatus for drilling fluid. Also provided as part of the permeability testing apparatus are a filter pad and support screen 23, graduated cylinder 25 to collect outflow from the funnel 21, a compressed air tank 27, a pressure gauge and adjustable valve 29 and pressure tubing 31 interconnecting the funnel 21 and the compressed air tank 27. The funnel is filled with the backfill material as described above during the permeability testing.

During permeability testing, the filter pad and support screen 23 are placed in the funnel 21 followed by the slow addition of the prepared backfill material using a spoon or the like to avoid air bubble entrapment in the backfill material. The depth of the backfill material was measured followed by gently pouring tap water into the filtration funnel 21. The lid 33 was then screwed on followed by connection of the pressure tubing 31 thereto. The compressed air was applied to the filtration funnel until a preset pressure of 3 psi was reached. As soon as the permeate outflow started, the accumulated volume of filtrate versus time was recorded. The 200 mg/l 2-pentanone solution replaced the tap water immediately after the permeability of the test specimen material with tap water reached a steady state, the baseline permeability.

Every consecutive 5 ml of filtrate was obtained for the chemical oxygen demand (COD) test to correlate to the concentration of the 2-pentanone solution. By recording this concentration versus time, a breakthrough curve can be plotted. The breakthrough curve as discussed hereinafter was determined for both the soil-bentonite backfill and the soil-bentonite granular activated carbon backfill. To minimize any correlation error in the COD testing, the last 5 ml of filtrate before the introduction of the 2-pentanone solution was collected as a blank for the COD testing.

To avoid errors resulting from the headloss in the tubes, porous plate and filter paper, the effluent rate in the absence of the soil backfill material should be at least 10 times greater than the effluent rate measured when the backfill material is placed inside the stainless filtration funnel. During testing, this criterion was carefully verified.

To accelerate the permeability testing, a wide range of hydraulic gradients were examined, including 34, 54, 73 and 100. It was found that a plot of the filtrate flux versus the hydraulic gradients were approximately linear such that a gradient under 100 was acceptable to accelerate the testing.

The porosity of the soil-bentonite backfill and the soil-bentonite granular activated carbon backfill was determined by a mass balance, i.e., the total water volume in the soil column divided by the total soil column volume.

In conjunction with the permeation investigation, in order to determine the retardation factor of the soil-bentonite-granular carbon mixture, the partitioning of the 2-pentanone was measured in batch adsorption experiments. Aliquots of 100 ml samples of the 200 mg/l 2-pentanone solution were transferred to 250 ml Erlenmeyer flasks. Nine different amounts of the soil-bentonite-granular activated carbon mixtures ranging from 0.05 to 20.0 g were added to the flask after being oven-dried. One flask was retained as a control.

All the flasks were immediately stoppered by corks and were continually shaken for four days in a shaker at room temperature. It was found that the equilibrium concentrations were the same after two days and four days of shaking, indicating the adsorption reaction in solutions had reached equilibrium. Thus, after four days, all the solutions were immediately sampled from each flask and filtered through a 0.45 um filter. An analysis of the equilibrium concentration of the 2-pentanone solutions was conducted by COD test and an adsorption isotherm was determined to calculate the retardation factor in accordance with well known procedures.

RESULTS AND DISCUSSION

As demonstrated by the results shown in Table 3, the backfill materials containing the granulated activated carbon were within their required ranges and engineering quality. The slump results for the granular activated carbon containing backfill was only slightly reduced from the slump of the soil-bentonite backfill, i.e., 2.8 inches versus 3.5 inches. However, both slump results are within the required range. Thus, the granular activated carbon does not have an adverse effect on the slump of the backfill.

In addition, the other measured engineering properties such as bulk density, water content, and bentonite content were also within the required ranges. Since the addition of 2% of granular activated carbon only slightly reduced the bulk density and was still above the minimum value of 1.68 g/cm$^3$, levels of granular activated carbon can be added to increase the adsorption capacity, i.e., the retardation factor, of backfills if necessary. It is anticipated that at least 5% granular activated carbon can be added. However, since the optimum granular activated dosage has not been fully studied, an upper limit is not known. The upper limit may be based on the determination of a compromise between the effects of bulk density, slump, permeability, the retardation factor increase and economy considerations.

Table 4 shows the parameter values used in the permeability testing of the two backfill materials. A gradient of 56 was applied to the soil-bentonite-granular activated carbon backfill as opposed to the 39 gradient for the soil-bentonite backfill.

TABLE 4

| Parameter Values Used in Permeability Tests | | |
| --- | --- | --- |
| Parameters | Soil-Bentonite-GAC Backfill | Soil-Benonite Backfill |
| Air Pressure Applied (psi) | 3 | 3 |
| Length of Backfill Column (cm) | 3.8 | 4.6 |
| Gradient | 56 | 39 |

Figure 3:
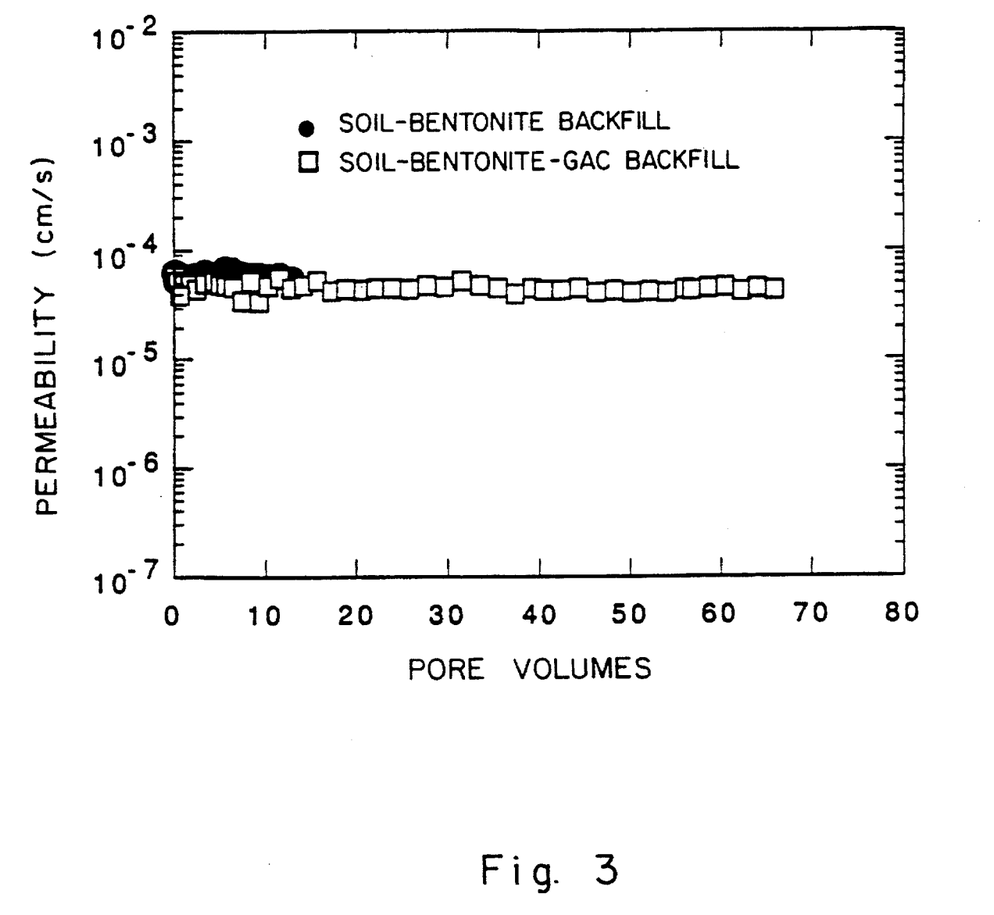
FIG. 3 is a graph relating permeability and pore volumes comparing the prior art and the inventive composition and structure.

FIG. 3 illustrates the permeability test results between the soil-bentonite backfill and the soil-bentonite-granular activated carbon backfill material. The average value of permeabilities for these two backfills were $5.2 \times 10^{-3}$ cm/s and $6.0 \times 10^{-}$cm/s respectively. This indicates that the permeability was not adversely affected by the 2% addition of granular activated carbon and that its particle size distribution also did not greatly affect the permeability.

The soil-bentonite-granular activated carbon backfill also exhibited an improved retardation factor as compared to soil-bentonite backfills. The retardation factor considers the adsorption effect on solute transport in a porous medium as defined in the publication "Diffusion of Strontium and Chloride in Compacted Clay-based Materials" *Soil Sci. Soc. Am. J.*, Vol. 51, pgs. 1102–1108, (1987), authored by Robin M. J. L. et al and incorporated by reference. Typical retardation factors for hydrocarbons found in soils vary from 2 to 9.

Based upon the batch adsorption experiments discussed above, a retardation factor of 65 was determined for the 2-pentanone in the soil-bentonite-granular carbon activated backfill. Thus, the granular activated carbon-containing backfill demonstrated vastly improved results regarding retardation of migration of organic transport over prior art backfill materials.

Figure 4:
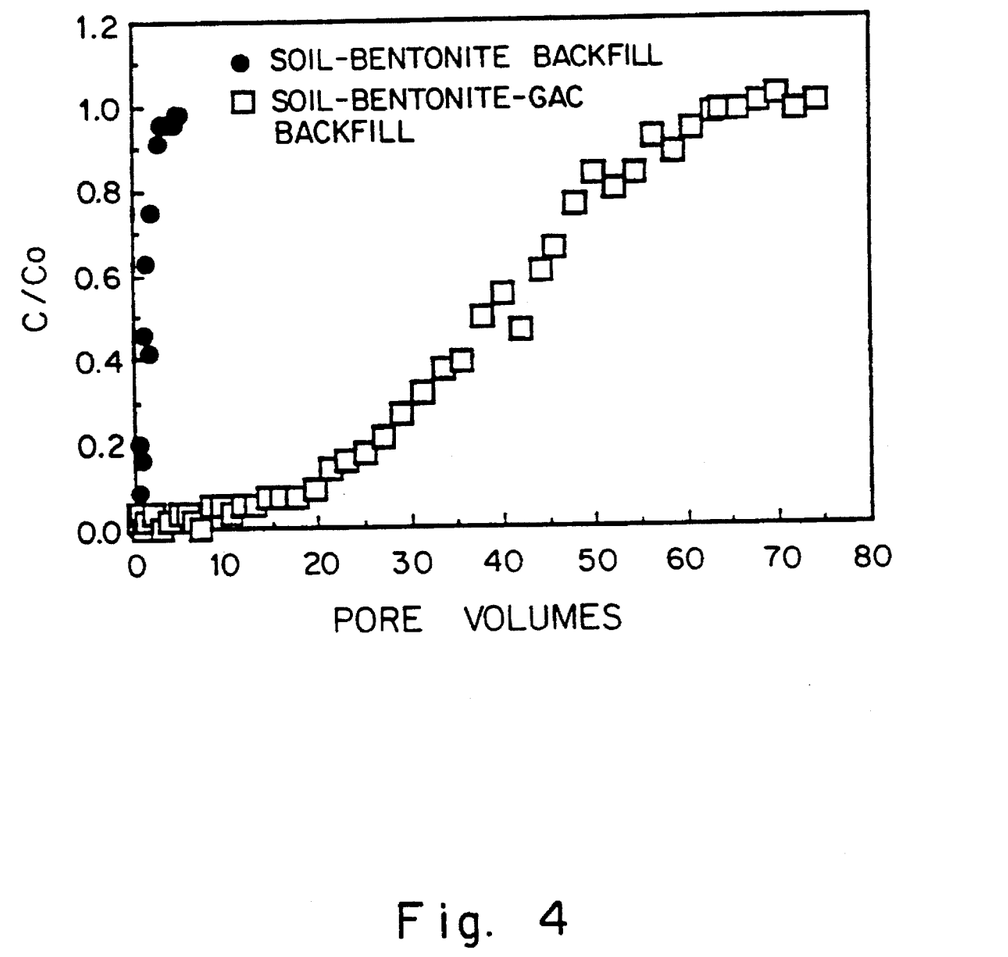
FIG. 4 is a graph depicting breakthrough of an organic compound comparing the materials shown in FIG. 3.

With reference to FIG. 4, the breakthrough curves for both the soil-bentonite backfill and the soil-bentonite-granular activated carbon backfill using the 2-pentanone solution are illustrated. The graph plots the concentration of the 2-pentanone versus pore volumes which is identical to the volume of the soil in the column times the porosity. Porosities are 0.42 and 0.40 for the soil-bentonite backfill and soil-bentonite-granular activated carbon backfill, respectively. As can be seen from FIG. 4, the addition of granular activated carbon increases substantially the time required for contaminant breakthrough and postpones the appearance breakthrough approximately ten times of pore volumes.

It should be understood that different concentration ratios can be used as a breakthrough point. For example, a concentration ratio of 0.3 can mark the breakthrough point for a particular use of the backfill material. Notwithstanding the identification of different concentrations for a breakthrough point, FIG. 4 still illustrates that the granular activated carbon-containing backfill effectively lengthens the time for organic or inorganic contaminant transport through the backfill material as compared to a backfill material without granular activated carbon.

The breakthrough curve of FIG. 4 was plotted using the gradients shown in Table 3. Given that the granular activated carbon-containing backfill used a gradient considerably higher than the soil-bentonite backfill, it is anticipated that a breakthrough curve based upon a comparison of the two backfills using the same gradient would illustrate even more improved results than that shown in FIG. 4. That is, for similar gradients, the curve shown in FIG. 4 would be displaced to the right to show a higher pore volume amount for a given concentration under these conditions. This indicates that the addition of granular activated carbon can dramatically increase the effectiveness and life span of slurry walls or other containment structures to contain dissolved wastes.

Since the transport of solutes in slurry walls is primarily controlled by the mechanisms of advection and dispersion, and given that the two backfill materials have similar permeabilities and porosities, the effects of advection and dispersion on differences between the solute breakthrough curve are minimized. Thus, the significantly retarded appearance of 2-pentanone in the soil-bentonite-granular activated backfill in the outflow is directly attributable to the adsorption of the organic material by the granular activated carbon.

During initial permeability testing, powdered activated carbon (BL type—Calgon Carbon Corporation), much smaller in size than GAC, was used as an alternative activated carbon to the granular activated carbon. However, the powdered activated carbon migrated with seepage flow through the backfill material and appeared in the filtrate exiting the filtration funnel. Thus, the powdered activated carbon was unacceptable as a potential organic or inorganic contaminant adsorbent. Powdered activated carbon in the filtrate outflow would provide unacceptable levels of organic contaminant transport through the slurry wall structure by adherence of the contaminants to the powdered activated carbon. With this facilitated transport of chemicals, powdered activated carbon would contribute to environmental degradation when used in slurry walls or other clay-containing waste material containment systems or structures.

In summary, the use of granular activated carbon as an enhancement additive to a clay-containing waste material containment system such as soil-bentonite slurry walls results in a significant increase in organic material adsorption without any loss in physical characteristics which would adversely affect the waste material containment system structure. For example, no loss in permeability results when using granular activated carbon in these types of structures. In addition, since granular activated carbon can also adsorb some metallic ions, slurry wall or other containment wall systems incorporating granular activated carbon can successfully inhibit the transport of inorganic contaminants including radioactive isotopes through these types of containment systems. The granular activated carbon can also be utilized to adsorb organic contaminant waste containing radioactive isotopes.

The present invention wherein granular activated carbon is used in a waste material containment system is adaptable for any known containment structures utilizing a clay-containing composition and structure. In particular, any water-swellable clay besides the disclosed bentonite can be used in these types of structures. Moreover, the water-swellable clays can be modified as suggested in the prior art with other additives, if desired.

As such, an invention has been disclosed in terms of preferred embodiments thereof which fulfill each and every one of the objects of the present invention as set forth hereinabove and provides a new and improved low permeability waste material containment construction and composition containing granular activated carbon and a method of making such a containment construction.

Of course, various changes, modifications and alterations from the teachings of the present invention may be contemplated by those skilled in the art without departing from the intended scope thereof. Accordingly, it is intended that the present invention only be limited by the terms of the appended claims.

I claim:

1. In a low permeability containment structure composition for containment of waste material including inorganic and organic contaminants wherein the low permeability containment structure composition includes at least a clay component, the improvement comprising said composition further comprising about 2% by weight of a granular activated carbon based on a weight of said structure as an additive to said composition for retarding migration of said organic and inorganic contaminants through said containment structure, wherein said additive-containing composition has a permeability that approximates a permeability of said composition including at least said clay component without said additive; and said additive-containing composition approximates the bulk density and slumping of said composition including at least said clay component without said additive.

2. The composition of claim 1 wherein said granular activated carbon has a size ranging between 50 and 200 mesh.

3. In a method of containing waste material using an engineered low permeability containment structure, wherein said engineered low permeability containment structure contains at least a clay component, the improvement comprising about 2% by weight of granular activated carbon based on a weight of said containment structure as an additive to said low permeability containment structure to retard migration of inorganic and organic contaminants from said waste material through said containment structure, wherein the additive-containing low permeability containment structure has a permeability approximating a permeability of said low permeability containment structure containing at least said clay component without said additive, and said additive-containing low permeability containment structure has a bulk density approximating said low permeability containment structure including at least said clay component without said additive.

4. In an engineered low permeability containment system including a clay component for containing waste material including inorganic and organic contaminants, the improvement comprising said low permeability containment structure including about 2% by weight of a granular activated carbon based on a weight of the total containment system as an additive to retard migration of said organic and inorganic contaminants through said containment system, wherein said additive-containing containment system has a permeability that approximates permeability of said containment system including at least said clay component without said additive, and said additive-containing containment system has a bulk density and slumping that approximates the bulk density and slumping of said containment system including at least said clay component without said additive.

5. The containment system of claim 4 wherein said granular activated carbon has a size ranging between 50 and 200 mesh.

6. The containment system of claim 4 wherein said low permeability containment system comprises a soil-bentonite slurry wall surrounding said waste material laterally.

7. The low permeability containment system of claim 4 wherein said low permeability containment structure comprises a liner enclosing said waste material.

8. The containment system of claim 6 wherein said soil-bentonite slurry wall includes up to 5% of said granular activated carbon.

9. The method of claim 3 wherein said granular activated carbon additive is used in an engineered low permeability containment structure comprising a soil-bentonite slurry wall.

* * * * *